(12) United States Patent
Higginson et al.

(10) Patent No.: US 10,198,255 B2
(45) Date of Patent: Feb. 5, 2019

(54) METHOD AND SYSTEM FOR REDUCING INSTABILITY WHEN UPGRADING SOFTWARE

(71) Applicant: Oracle International Corporation, Redwood Shores, CA (US)

(72) Inventors: Antony Higginson, Widnes (GB); Michael Greenough, Cheshire (GB); Catalin Trifu, Brasov (RO); John Masterson, Navan (IE); Jean Fagan, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 38 days.

(21) Appl. No.: 15/250,522

(22) Filed: Aug. 29, 2016

(65) Prior Publication Data

US 2016/0364229 A1    Dec. 15, 2016

Related U.S. Application Data

(63) Continuation of application No. 13/937,977, filed on Jul. 9, 2013, now Pat. No. 9,442,983.

(51) Int. Cl.
*G06F 11/07* (2006.01)
*G06F 8/65* (2018.01)
(Continued)

(52) U.S. Cl.
CPC ............ *G06F 8/65* (2013.01); *G06F 11/3414* (2013.01); *G06F 11/3664* (2013.01);
(Continued)

(58) Field of Classification Search
CPC ................ G06F 7/78; G06F 8/00–8/78; G06F 9/44–9/455; G06F 11/36
(Continued)

(56) References Cited

U.S. PATENT DOCUMENTS 6,016,394 A    1/2000   Walker
6,185,625 B1   2/2001   Tso et al.
(Continued)

FOREIGN PATENT DOCUMENTS

CN    1652087 A       8/2005
CN    101204042 A     6/2008
(Continued)

OTHER PUBLICATIONS

Miller, How to Score Customer Feedback/Bugs and Stores (for agile), 2013 (Year: 2013).*

(Continued)

*Primary Examiner* — S. Sough
*Assistant Examiner* — H. Sough
(74) *Attorney, Agent, or Firm* — Kilpatrick Townsend & Stockton LLP

(57) ABSTRACT

A system and a method of rating software bugs using a bug scoring and tracking system is presented. The system and method may use automated scoring of the bugs to determine the impact of the bug. The system and method may connect to one or more databases to determine the extent of the deployment of the software, the impact of the bug, and/or the history of the bug. Scoring is used to prioritize the bugs and the scoring is extensible and adjustable allowing easy addition of new parameters and allowing the system to be modified for different bug types, software, or customers.

20 Claims, 6 Drawing Sheets

(51) Int. Cl.
  *G06F 17/30* (2006.01)
  *G06F 11/36* (2006.01)
  *G06F 11/34* (2006.01)
  *H04L 12/26* (2006.01)

(52) U.S. Cl.
  CPC .... *G06F 17/3053* (2013.01); *G06F 17/30554* (2013.01); *H04L 43/04* (2013.01); *H04L 43/067* (2013.01); *G06F 11/3466* (2013.01); *G06F 2201/875* (2013.01)

(58) Field of Classification Search
  USPC .................................................. 717/100–178
  See application file for complete search history.

(56) References Cited

U.S. PATENT DOCUMENTS

| | | |
|---|---|---|
| 6,477,483 B1 | 11/2002 | Scarlat et al. |
| 6,738,811 B1 | 5/2004 | Liang |
| 6,973,489 B1 | 12/2005 | Levy |
| 7,177,866 B2 | 2/2007 | Holenstein et al. |
| 7,290,003 B1 | 10/2007 | Tong |
| 7,548,898 B1 | 6/2009 | Tarenskeen et al. |
| 7,580,862 B1 | 8/2009 | Montelo et al. |
| 7,693,983 B1 | 4/2010 | Gupta et al. |
| 8,150,811 B1 | 4/2012 | Tarenskeen et al. |
| 8,271,757 B1 | 9/2012 | Chatterjee et al. |
| 8,606,894 B1 | 12/2013 | Fremont et al. |
| 8,639,989 B1 | 1/2014 | Sorenson, III et al. |
| 8,924,353 B1 | 12/2014 | Patwardhan et al. |
| 8,943,032 B1 | 1/2015 | Xu et al. |
| 9,098,364 B2 | 8/2015 | Davis |
| 9,401,904 B1 | 7/2016 | Hankins et al. |
| 9,442,983 B2 | 9/2016 | Higginson et al. |
| 9,491,072 B2 | 11/2016 | Raghunathan et al. |
| 9,747,311 B2 | 8/2017 | Buehne et al. |
| 9,762,461 B2 | 9/2017 | Raghunathan et al. |
| 9,792,321 B2 | 10/2017 | Buehne et al. |
| 9,805,070 B2 | 10/2017 | Buehne et al. |
| 9,967,154 B2 | 5/2018 | Masterson et al. |
| 9,996,562 B2 | 6/2018 | Higginson et al. |
| 2001/0029502 A1 | 10/2001 | Oeda |
| 2001/0044795 A1 | 11/2001 | Cohen et al. |
| 2002/0002578 A1 | 1/2002 | Yamashita |
| 2002/0019826 A1 | 2/2002 | Tan |
| 2002/0147645 A1 | 10/2002 | Alao et al. |
| 2002/0177977 A1 | 11/2002 | Scarlat et al. |
| 2002/0194329 A1 | 12/2002 | Alling |
| 2002/0198984 A1 | 12/2002 | Goldstein et al. |
| 2003/0037034 A1 | 2/2003 | Daniels et al. |
| 2003/0066049 A1* | 4/2003 | Atwood ............... G06F 11/3616 717/101 |
| 2003/0069903 A1 | 4/2003 | Gupta et al. |
| 2003/0192028 A1 | 10/2003 | Gusler et al. |
| 2004/0098425 A1 | 5/2004 | Wiss et al. |
| 2004/0153358 A1* | 8/2004 | Lienhart ............... G06Q 30/02 705/7.32 |
| 2004/0167840 A1 | 8/2004 | Tully et al. |
| 2004/0178261 A1 | 9/2004 | Potonniee et al. |
| 2004/0181790 A1 | 9/2004 | Herrick |
| 2004/0260875 A1 | 12/2004 | Murotani et al. |
| 2005/0021567 A1 | 1/2005 | Holenstein et al. |
| 2005/0055357 A1 | 3/2005 | Campbell |
| 2005/0055446 A1 | 3/2005 | Chidambaran et al. |
| 2005/0102318 A1 | 5/2005 | Odhner et al. |
| 2005/0204241 A1 | 9/2005 | Tamakoshi |
| 2006/0059253 A1 | 3/2006 | Goodman et al. |
| 2006/0112247 A1 | 5/2006 | Ramany et al. |
| 2006/0156086 A1 | 7/2006 | Flynn et al. |
| 2006/0173875 A1 | 8/2006 | Stefaniak et al. |
| 2006/0179171 A1 | 8/2006 | Stefaniak et al. |
| 2006/0179431 A1 | 8/2006 | Devanathan et al. |
| 2006/0235899 A1 | 10/2006 | Tucker |
| 2006/0282825 A1 | 12/2006 | Taylor |
| 2007/0028234 A1 | 2/2007 | Sero et al. |
| 2007/0089092 A1* | 4/2007 | Schmidt ............... G06F 8/10 717/126 |
| 2007/0150488 A1 | 6/2007 | Barsness et al. |
| 2007/0239774 A1 | 10/2007 | Bodily et al. |
| 2007/0299892 A1 | 12/2007 | Nakahara |
| 2008/0247320 A1 | 10/2008 | Grah et al. |
| 2008/0313595 A1 | 12/2008 | Boulineau et al. |
| 2009/0070733 A1 | 3/2009 | Huang et al. |
| 2009/0113399 A1 | 4/2009 | Tzoref et al. |
| 2009/0126022 A1 | 5/2009 | Sakaki |
| 2009/0187413 A1 | 7/2009 | Abels et al. |
| 2009/0210857 A1 | 8/2009 | Martineau |
| 2009/0238078 A1 | 9/2009 | Robinson et al. |
| 2009/0276771 A1 | 11/2009 | Nickolov et al. |
| 2009/0313311 A1 | 12/2009 | Hoffmann et al. |
| 2010/0005097 A1 | 1/2010 | Liang et al. |
| 2010/0049851 A1 | 2/2010 | Garrison et al. |
| 2010/0082543 A1 | 4/2010 | Nagarajan |
| 2010/0191884 A1 | 7/2010 | Holenstein et al. |
| 2010/0192156 A1 | 7/2010 | Hollingsworth |
| 2010/0198799 A1 | 8/2010 | Krishnan et al. |
| 2010/0262974 A1 | 10/2010 | Uyeda |
| 2011/0093436 A1 | 4/2011 | Zha et al. |
| 2011/0107327 A1 | 5/2011 | Barkie et al. |
| 2011/0161933 A1* | 6/2011 | Hudson ............... G06F 11/0769 717/125 |
| 2012/0017112 A1 | 1/2012 | Broda et al. |
| 2012/0041933 A1 | 2/2012 | Driesen |
| 2012/0102498 A1* | 4/2012 | Subramanya ............ G06F 9/50 718/104 |
| 2012/0150642 A1 | 6/2012 | Kandanala et al. |
| 2012/0221845 A1 | 8/2012 | Ferris |
| 2012/0254435 A1 | 10/2012 | Zhaofu et al. |
| 2012/0265726 A1 | 10/2012 | Padmanabhan et al. |
| 2012/0284360 A1 | 11/2012 | Bense et al. |
| 2012/0297016 A1 | 11/2012 | Iyer et al. |
| 2012/0297059 A1 | 11/2012 | Bross |
| 2012/0303739 A1 | 11/2012 | Ferris |
| 2012/0311128 A1 | 12/2012 | Pechanec et al. |
| 2013/0067298 A1 | 3/2013 | Li et al. |
| 2013/0085742 A1 | 4/2013 | Barker et al. |
| 2013/0085989 A1 | 4/2013 | Nayyar et al. |
| 2013/0086130 A1 | 4/2013 | Wang et al. |
| 2013/0152050 A1 | 6/2013 | Chang et al. |
| 2013/0173546 A1 | 7/2013 | Cline et al. |
| 2013/0173547 A1 | 7/2013 | Cline et al. |
| 2013/0211559 A1 | 8/2013 | Lawson et al. |
| 2013/0268643 A1 | 10/2013 | Chang et al. |
| 2013/0268799 A1 | 10/2013 | Mestery et al. |
| 2013/0268800 A1 | 10/2013 | Rangaiah |
| 2013/0283364 A1 | 10/2013 | Chang et al. |
| 2013/0297802 A1 | 11/2013 | Laribi et al. |
| 2013/0311968 A1* | 11/2013 | Sharma ............... G06Q 10/06 717/101 |
| 2013/0326028 A1 | 12/2013 | Cox et al. |
| 2013/0339419 A1 | 12/2013 | Emaru et al. |
| 2014/0007216 A1 | 1/2014 | Ahn |
| 2014/0019212 A1 | 1/2014 | Lieblich et al. |
| 2014/0019961 A1 | 1/2014 | Neuse et al. |
| 2014/0059559 A1 | 2/2014 | Alatorre et al. |
| 2014/0075033 A1 | 3/2014 | Doering et al. |
| 2014/0089495 A1 | 3/2014 | Akolkar et al. |
| 2014/0089809 A1 | 3/2014 | Levy et al. |
| 2014/0109053 A1 | 4/2014 | Vasudevan et al. |
| 2014/0129690 A1* | 5/2014 | Jaisinghani et al. ........... G06F 9/5061 709/222 |
| 2014/0172782 A1 | 6/2014 | Schuenzel et al. |
| 2014/0195636 A1 | 7/2014 | Karve et al. |
| 2014/0279890 A1 | 9/2014 | Srinivasan et al. |
| 2014/0337429 A1 | 11/2014 | Asenjo et al. |
| 2014/0344439 A1 | 11/2014 | Kempf et al. |
| 2014/0373011 A1 | 12/2014 | Anderson et al. |
| 2015/0019195 A1 | 1/2015 | Davis |
| 2015/0019197 A1 | 1/2015 | Higginson et al. |
| 2015/0019478 A1 | 1/2015 | Buehne et al. |
| 2015/0019479 A1 | 1/2015 | Buehne et al. |
| 2015/0019487 A1 | 1/2015 | Buehne et al. |
| 2015/0019488 A1 | 1/2015 | Higginson et al. |

(56) References Cited

U.S. PATENT DOCUMENTS

| | | | |
|---|---|---|---|
| 2015/0019564 | A1 | 1/2015 | Higginson et al. |
| 2015/0019700 | A1 | 1/2015 | Masterson et al. |
| 2015/0019706 | A1 | 1/2015 | Raghunathan et al. |
| 2015/0019707 | A1 | 1/2015 | Raghunathan et al. |
| 2015/0020059 | A1 | 1/2015 | Davis |
| 2015/0058467 | A1 | 2/2015 | Douglas et al. |
| 2015/0355947 | A1 | 12/2015 | Polkovnikov |
| 2015/0358392 | A1 | 12/2015 | Ramalingam et al. |
| 2017/0118244 | A1 | 4/2017 | Bai et al. |
| 2017/0278012 | A1 | 9/2017 | Prasad et al. |
| 2017/0337193 | A1 | 11/2017 | Buehne et al. |
| 2017/0351716 | A1 | 12/2017 | Higginson et al. |
| 2018/0060313 | A1 | 3/2018 | Buehne et al. |

FOREIGN PATENT DOCUMENTS

| | | |
|---|---|---|
| CN | 102656565 | 9/2012 |
| CN | 105308577 | 2/2016 |
| CN | 105324756 | 2/2016 |
| CN | 105324769 | 2/2016 |
| CN | 105359102 | 2/2016 |
| CN | 105359146 | 2/2016 |
| CN | 105359147 | 2/2016 |
| CN | 105393250 | 3/2016 |
| CN | 105556515 | 5/2016 |
| CN | 105580032 | 5/2016 |
| CN | 105580032 | 11/2017 |
| CN | 105308577 | 1/2018 |
| CN | 107729252 | 2/2018 |
| EP | 2418591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |
| EP | 3019981 | 5/2016 |
| EP | 3020010 | 5/2016 |
| EP | 3019961 | 3/2018 |
| GB | 2468742 | 9/2010 |
| JP | 2006277153 | 10/2006 |
| WO | 9952047 | 10/1999 |
| WO | 0153949 | 7/2001 |
| WO | 2015005991 | 1/2015 |
| WO | 2015005994 | 1/2015 |
| WO | 2015006124 | 1/2015 |
| WO | 2015006129 | 1/2015 |
| WO | 2015006132 | 1/2015 |
| WO | 2015006137 | 1/2015 |
| WO | 2015006138 | 1/2015 |
| WO | 2015006308 | 1/2015 |
| WO | 2015006358 | 1/2015 |
| WO | 2015/191119 A1 | 12/2015 |
| WO | 2017/213803 A1 | 12/2017 |

OTHER PUBLICATIONS

Liang et al., Automatic Construction of an Effective Training Set for Prioritizing Static Analysis Warnings, 2010 (Year: 2010).*
Buyukozkan et al., Group decision making to better respond customer needs in software development, 2005, computer & industrial engineering, 48, p. 427-441 (Year: 2005).*
Laplante et al., Pavlov's Bugs Matching Repair Policies with Rewards, 2009, IEEE, p. 45-51 (Year: 2009).*
Sharma et al., Predicting the Priority of a Reported Bug using Machine Learning Techniques and cross project validation, 2012, IEEE, 12th International Conference on Intelligent Systems Design and Applications, p. 539-545 (Year: 2012).*
Chinese Application No. CN201480035255.X received a Decision to Grant, dated Aug. 29, 2017, 4 pages.
U.S. Appl. No. 13/937,344, Notice of Allowance dated Oct. 11, 2016, 2 pages.
U.S. Appl. No. 13/937,486, Non-Final Office Action dated Nov. 4, 2016, 20 pages.
U.S. Appl. No. 13/937,970, Final Office Action dated Dec. 1, 2016, 22 pages.
U.S. Appl. No. 13/938,061, Final Office Action dated Mar. 23, 2017, 29 pages.
U.S. Appl. No. 13/937,868, Non-Final Office Action dated Apr. 5, 2017, 23 pages.
U.S. Appl. No. 13/937,970, Office Advisory Action dated Apr. 13, 2017, 5 pages.
Chinese Application No. 201480035255.X, Office Action dated Feb. 27, 2017, 11 pages (5 pages for the original document and 6 pages for the English translation).
Baysal et al., A bug you like: A framework for automated assignment of bugs, Program Comprehension, 2009. ICPC '09. IEEE 17th International Conference, May 17-19, 2009, pp. 297-298.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
Leite et al., Migratool: Towards a Web-Based Spatial Database Migration Tool, IEEE Computer Society, Proceedings of the 16th International Workshop on Database and Expert Systems Applications, Aug. 22, 2005, pp. 480-484.
Tao et al., Intelligent database placement in cloud environment, Web Services (ICWS), 2012 IEEE 19$^{th}$ International Conference, IEEE Computer Society, Jun. 24, 2012, pp. 544-551.
To, et al., Best Practices for Database Consolidation on Exadata Database Machine, Oracle, Oracle White Paper, 2011, 35 pages.
Vengurlekar, et al., Best Practices for Database Consolidation in Private Clouds, Oracle, Oracle White Paper, Mar. 2012, 29 pages.
International Application No. PCT/US2014/040486, International Preliminary Report on Patentability dated Oct. 1, 2015, 18 pages.
International Application No. PCT/US2014/040486, International Search Report and Written Opinion dated Sep. 29, 2014, 11 pages.
International Application No. PCT/US2014/040486, Written Opinion dated Jun. 17, 2015, 7 pages.
International Application No. PCT/US2014/040692, International Preliminary Report on Patentability dated Oct. 8, 2015, 27 pages.
International Application No. PCT/US2014/040692, International Search Report and Written Opinion dated Oct. 8, 2014, 10 pages.
International Application No. PCT/US2014/040692, Written Opinion dated Jul. 16, 2015, 7 pages.
International Application No. PCT/US2014/045226, International Preliminary Report on Patentability dated Jan. 21, 2016, 8 pages.
International Application No. PCT/US2014/045226, International Search Report and Written Opinion dated Oct. 30, 2014, 10 pages.
International Application No. PCT/US2014/045240, International Preliminary Report on Patentability dated Jan. 21, 2016, 8 pages.
International Application No. PCT/US2014/045240, International Search Report and Written Opinion dated Oct. 21, 2014, 10 pages.
International Application No. PCT/US2014/045247, International Preliminary Report on Patentability dated Jan. 21, 2016, 6 pages.
International Application No. PCT/US2014/045247, International Search Report and Written Opinion dated Sep. 3, 2014, 8 pages.
International Application No. PCT/US2014/045282, International Preliminary Report on Patentability dated Jan. 21, 2016, 9 pages.
International Application No. PCT/US2014/045282, International Search Report and Written Opinion dated Sep. 18, 2014, 12 pages.
International Application No. PCT/US2014/045289, International Preliminary Report on Patentability dated Jan. 21, 2016, 7 pages.
International Application No. PCT/US2014/045289, International Search Report and Written Opinion dated Oct. 15, 2014, 9 pages.

(56) References Cited

OTHER PUBLICATIONS

International Application No. PCT/US2014/045721, International Preliminary Report on Patentability dated Jan. 21, 2016, 8 pages.
International Application No. PCT/US2014/045721, International Search Report and Written Opinion dated Nov. 4, 2014, 12 pages.
International Application No. PCT/US2014/045804, International Preliminary Report on Patentability dated Jan. 21, 2016, 8 pages.
International Application No. PCT/US2014/045804, International Search Report and Written Opinion dated Nov. 17, 2014, 12 pages.
U.S. Appl. No. 13/937,344, Corrected Notice of Allowability dated Sep. 15, 2016, 2 pages.
U.S. Appl. No. 13/937,344, Final Office Action dated Feb. 11, 2016, 12 pages.
U.S. Appl. No. 13/937,344, Non-Final Office Action dated Sep. 24, 2015, 11 pages.
U.S. Appl. No. 13/937,344, Notice of Allowance dated May 4, 2016, 11 pages.
U.S. Appl. No. 13/937,344, Notice of Allowance dated Jun. 6, 2016, 5 pages.
U.S. Appl. No. 13/937,483, Advisory Action dated May 12, 2016, 3 pages.
U.S. Appl. No. 13/937,483, Final Office Action dated Feb. 26, 2016, 13 pages.
U.S. Appl. No. 13/937,483, Non-Final Office Action dated Aug. 12, 2016, 13 pages.
U.S. Appl. No. 13/937,483, Non-Final Office Action dated Sep. 25, 2015, 13 pages.
U.S. Appl. No. 13/937,486, Final Office Action dated Jul. 28, 2016, 18 pages.
U.S. Appl. No. 13/937,486, Non-Final Office Action dated Jan. 11, 2016, 14 pages.
U.S. Appl. No. 13/937,545, Final Office Action dated May 13, 2016, 20 pages.
U.S. Appl. No. 13/937,545, Non-Final Office Action dated Nov. 10, 2015, 19 pages.
U.S. Appl. No. 13/937,868, Final Office Action dated Apr. 22, 2016, 23 pages.
U.S. Appl. No. 13/937,868, Non-Final Office Action dated Nov. 4, 2015, 18 pages.
U.S. Appl. No. 13/937,885, Non-Final Office Action dated Aug. 18, 2016, 32 pages.
U.S. Appl. No. 13/937,970, Final Office Action dated Dec. 10, 2015, 18 pages.
U.S. Appl. No. 13/937,970, Non-Final Office Action dated May 5, 2015, 17 pages.
U.S. Appl. No. 13/937,970, Non-Final Office Action dated May 12, 2016, 28 pages.
U.S. Appl. No. 13/937,977, Corrected Notice of Allowability dated Jul. 18, 2016, 2 pages.
U.S. Appl. No. 13/937,977, Final Office Action dated Feb. 26, 2015, 30 pages.
U.S. Appl. No. 13/937,977, Non-Final Office Action dated Aug. 12, 2014, 28 pages.
U.S. Appl. No. 13/937,977, Non-Final Office Action dated Aug. 19, 2015, 34 pages.
U.S. Appl. No. 13/937,977, Notice of Allowance dated Mar. 16, 2016, 18 pages.
U.S. Appl. No. 13/937,988, Non-Final Office Action dated Sep. 1, 2016, 10 pages.
U.S. Appl. No. 13/938,061, Non-Final Office Action dated Aug. 18, 2016, 29 pages.
U.S. Appl. No. 13/938,066, Corrected Notice of Allowability dated Jun. 2, 2015, 2 pages.
U.S. Appl. No. 13/938,066, Non-Final Office Action dated Dec. 17, 2014, 19 pages.
U.S. Appl. No. 13/938,066, Notice of Allowance dated Apr. 29, 2015, 15 pages.
CN201480035259.8 received an Office Action, dated Nov. 14, 2017, 17 pages.
U.S. Appl. No. 13/937,970, filed Jul. 9, 2013 received a Notice of Allowance, dated Dec. 28, 2017, 9 pages.
U.S. Appl. No. 13/937,483, Notice of Allowance dated May 3, 2017, 5 pages.
U.S. Appl. No. 13/937,988, Notice of Allowance dated Apr. 27, 2017, 8 pages.
U.S. Appl. No. 13/937,885, Final Office Action dated May 19, 2017, 31 pages.
Chinese Application No. 201480035257.9, Office Action dated Apr. 6, 2017, 23 pages.
European Application No. 14745014.2, Office Action dated May 2, 2017, 27 pages.
Wilton, Jeremiah: "A look at Real Application Testing from a customer's perspective", Jan. 1, 2007 (Jan. 1, 2007 ), XP055357904, Retrieved from the Internet: URL:http://www.oracle.com/technetwork/oem/grid-control/overview/ratcust-perspectives-white-paper-o-132919.pdf [retrieved on Mar. 23, 2017].
U.S. Appl. No. 13/937,486, filed Jul. 9, 2013, Notice of Allowance dated Jun. 16, 2017, 5 pages.
U.S. Appl. No. 13/937,545, filed Jul. 9, 2013, Notice of Allowance dated Jun. 15, 2017, 10 pages.
U.S. Appl. No. 13/937,970, filed Jul. 9, 2013, Non-Final Office Action dated Jun. 26, 2017, 31 pages.
U.S. Appl. No. 13/938,061, filed Jul. 9, 2013, Advisory Action dated Jul. 26, 2017, 6 pages.
International Search Report and Written Opinion of PCT/US2017/032620 filed May 15, 2017 dated Jul. 28, 2017, all pages.
U.S. Appl. No. 13/937,868, filed Jul. 9, 2013 received a Final Office Action dated Oct. 27, 2017, 25 pages.
U.S. Appl. No. 13/937,970, filed Jul. 9, 2013 received an Applicant Initiated Interview Summary, dated Oct. 5, 2017, 3 pages.
CN Application No. CN201480035257.9 filed Jul. 2, 2014, received a Notice of Decision to Grant dated Oct. 11, 2017, 4 pages.
U.S. Appl. No. 13/937,483, Notice of Allowance dated Jan. 20, 2017, 8 pages.
U.S. Appl. No. 13/937,545, Non-Final Office Action dated Feb. 7, 2017, 19 pages.
European Application No. 14745014.2, Office Action dated Jan. 18, 2017, 8 pages.
EP14745015.9 received an Office Action dated May 14, 2018, 5 pages.
EP14745013.4 received an Office Action dated Apr. 30, 2018. 6 pages.
CN201480035259.8 received an office action dated Jun. 14, 2018, 19 pages.
U.S. Appl. No. 15/175,213 received a Non-Final Office Action dated Jul. 11, 2018, 35 pages.
U.S. Appl. No. 13/937,868, Notice of Allowance dated Feb. 8, 2018, 10 pages.
U.S. Appl. No. 13/937,970, Supplemental Notice of Allowance dated Jan. 19, 2018, 6 pages.
U.S. Appl. No. 15/789,049, Non-Final Office Action dated Feb. 2, 2018, 14 pages.
European Application No. 14745014.2, Notice of Decision to Grant dated Feb. 22, 2018, 2 pages.

\* cited by examiner

METHOD AND SYSTEM FOR REDUCING INSTABILITY WHEN UPGRADING SOFTWARE

CROSS-REFERENCES TO RELATED APPLICATIONS

The present application is a continuation of U.S. patent application Ser. No. 13/937,977, filed Jul. 9, 2013, entitled "METHOD AND SYSTEM FOR REDUCING INSTABILITY WHEN UPGRADING SOFTWARE," the entire contents of which are incorporated herein by reference for all purposes.

Further, the present application is related to the following commonly-owned U.S. patent applications:
U.S. patent application Ser. No. 13/938,061, filed Jul. 9, 2013, and entitled "CONSOLIDATION PLANNING SERVICE FOR SYSTEMS MIGRATION;"
U.S. patent application Ser. No. 13/938,066, filed Jul. 9, 2013, and entitled "MIGRATION SERVICES FOR SYSTEMS;"
U.S. patent application Ser. No. 13/937,885, filed Jul. 9, 2013, and entitled "DATABASE MODELING AND ANALYSIS;"
U.S. patent application Ser. No. 13/937,868, filed Jul. 9, 2013, and entitled "AUTOMATED DATABASE MIGRATION ARCHITECTURE;"
U.S. patent application Ser. No. 13/937,344, filed Jul. 9, 2013 and entitled "CLOUD SERVICES LOAD TESTING AND ANALYSIS;"
U.S. patent application Ser. No. 13/937,483, and filed Jul. 9, 2013, and entitled "CLOUD SERVICES PERFORMANCE TUNING AND BENCHMARKING;"
U.S. patent application Ser. No. 13/937,988, filed Jul. 9, 2013, and entitled, "SOLUTION TO GENERATE A SCRIPTSET FOR AN AUTOMATED DATABASE MIGRATION;"
U.S. patent application Ser. No. 13/937,545, filed Jul. 9, 2013, and entitled, "ONLINE DATABASE MIGRATION;"
U.S. patent application Ser. No. 13/937,486, filed Jul. 9, 2013, and entitled "DYNAMIC MIGRATION SCRIPT MANAGEMENT;" and
U.S. patent application Ser. No. 13/937,970, filed Jul. 9, 2013, and entitled "ADVANCED CUSTOMER SUPPORT SERVICES—ADVANCED SUPPORT CLOUD PORTAL,"
of which the entire disclosure of each is incorporated herein by reference for all purposes.

BACKGROUND OF THE INVENTION

The present invention generally relates to databases and more specifically to apparatuses and methods for providing a software bug tracking, maintenance, and ranking tool.

Modern database systems are very complex, comprised of numerous components and are often are used for performance-sensitive operations. As the complexity of software applications increases, the number of bugs is likely to increase. Software bugs may range from obscure mistakes that have little or no impact to critical security or performance flaws. It is important to track these bugs to ensure the most critical errors get priority and the appropriate systems are updated with fixes or patches in a timely manner.

BRIEF SUMMARY OF THE INVENTION

Tracking, prioritizing, and ranking software bugs and the updates associated with the bugs may be made more reliable, faster, and accurate using the systems and method described herein. A system and a method of rating software bugs using a bug scoring and tracking system is presented. The system and method may use automated scoring of the bugs to determine the impact of the bug. Scoring may be used to prioritize the bugs and the scoring may be extensible and adjustable allowing easy addition of new parameters and allowing the system to be modified for different bug types, software, or customers.

In some embodiments, a system for bug prioritization includes one or more processors and a memory communicatively coupled with and readable by the one or more processors and having stored therein a series of instructions which, when executed by the one or more processors, cause the one or more processors to prioritize a software bug by performing a series of steps. The steps may include receiving a software bug report, the software bug report may have a data portion describing the software bug and the data portion may include information describing at least an effect of the software bug. Another step may determine a code base of the software bug at least in part based on the effect of the software bug and further receive a customer preference, the customer preference may define a set of parameters that describe the customer's preferences for rating the importance of the software bug. The steps may further include calculating, without human input, a set of parameter scores in relation to the software bug, the set of parameter scores may quantify the set of parameters defined in the customer preference. Additionally grouping the set of parameter scores into a first group and a second group may be performed followed by computing a bug score using the first group and the second group. A bug report with a prioritization of the software bug may be generated, the prioritization based on the bug score.

In some embodiments the set of parameter scores may include a deployment parameter score. The deployment parameter score may summarizes number of times the code base has been deployed. The set of parameter scores may also include an impact parameter score that summarizes severity of the effect of the software bug, a related bug parameter score that summarizes number of bugs related to the software bug, and a technology parameter score that summarizes importance of the code base. The bug score of the software bug may be computed by taking an inner product of the parameter scores of the first group and the second group and the prioritization may be based on relative value of the bug score compared to scores of other bugs.

BRIEF DESCRIPTION OF THE DRAWINGS

A further understanding of the nature and advantages of various embodiments may be realized by reference to the following figures.

DETAILED DESCRIPTION OF THE INVENTION

Figure 1:
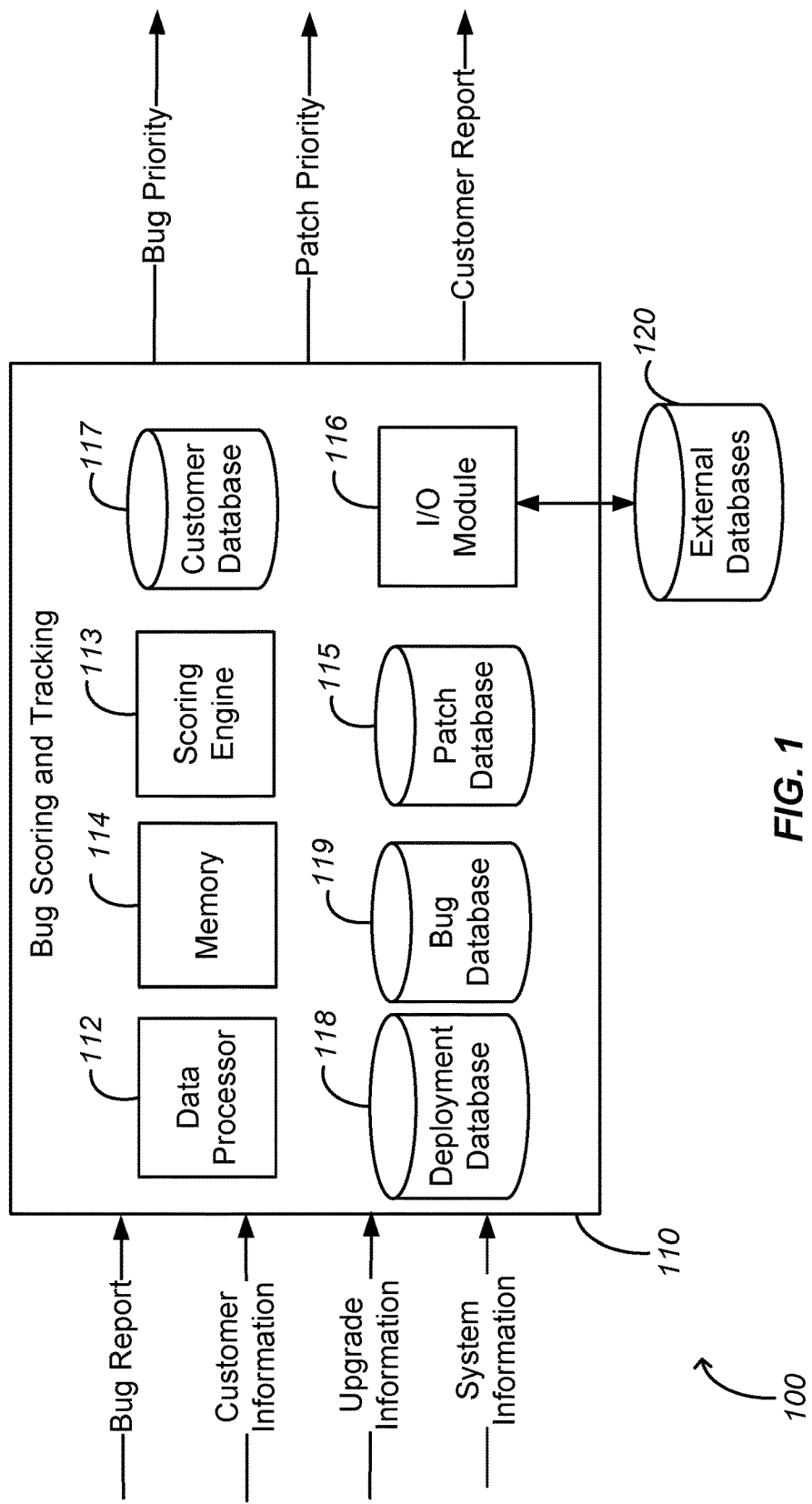
FIG. 1 illustrates a block diagram of an embodiment of a bug scoring system.

A bug may be some flaw in a software application that causes all or some portion of the software application to malfunction or to perform in some unexpected or unintended fashion. Many bugs are difficult to find and remain hidden until discovered by the end user. Software bugs may range from obscure mistakes that have little or no impact to critical security or performance flaws.

It is often difficult if not impossible to fix all reported bugs in a large complex system. Developers and software engineers may only have resources to fix a small subset of the bugs. Software bugs may need to be prioritized to ensure that the subset of bugs that gets fixed, or fixed first, corresponds to the errors that are the most critical to the system and/or the customers.

After a software bug is fixed it may be important to track and prioritize the software updates or patches associated with the bug. Customers may be selective as to the types of updates they will install. Due in part to complexities of systems, software patches or updates may sometimes themselves introduce new bugs that may be worse than the original bug or error they were intended to solve. Software updates may sometimes require restarting or pausing the operation of a system or a database which may disrupt a customer's business operation. The prioritization of a patch or software update may be used by the system administrator to decide the timing of when the patch will get applied, the breadth of the deployment, or if the update will be deployed at all.

Tracking, prioritizing, and ranking software bugs and the updates associated with the bugs often involves a number of complex, manual, and/or subjective methods and systems. The order that bugs get fixed may in some cases be based on the difficulty or complexity of each bug. Some bugs that are easy to solve but have a small impact may be fixed first while other more critical bugs may be put off in time by the developers due to their complexity. Likewise, some bugs may be subjectively assigned a high priority by an administrator or a developer based on the person's perceived importance of the bug. Each person or developer may have different levels of knowledge about a system, software, or the software's deployment characteristics causing inconsistent ranking and prioritization. For example, in some instances it may be desirable to assign high priority to bugs affecting software that has seen a high number of deployments. A bug, even if it a relatively low level error and does not cause a significant impact on any one individual system may, if deployed on a large number of systems, result in a collectively large impact affecting many customers. It may be desirable to assign a relatively low priority to a bug that may have a severe impact on any individual system if the software the bug affects has seen minimal deployment. Deployment information, for example, may be difficult for a person to accurately assess. In complex systems a code portion, module, plug-in and/or the like may be deployed only with a specific version of software, only to specific customers, or may be reused in other functions of a system further complicating an accurate assessment for the prioritization of a bug. Tracking tools that rely mainly on manual, user-based ranking and prioritization of bugs may therefore have inconsistent and incomplete rankings.

In one aspect methods for scoring and prioritizing of software bugs are presented. The methods may at least partially use automated scoring of the bugs. The methods may include receiving data from one or more databases to determine the extent of the deployment of the software, the impact of the bug, the history of the bug, and the like. The methods are extensible and customizable allowing easy addition of new parameters for the scoring. The bug scoring and prioritization may be modified for different bug types, software versions, customers, and the like.

Customization and extensibility of the bug scoring methods and associated systems may be important to accurately track and rate different types of software bugs, bugs that affect different customers and software packages. Some software deployments may always be contained in a private network or a private cloud environment, for example. In such deployments the customers may find bugs or software errors that may compromise the software's security as less critical since the software may never be exposed to malicious outsiders. These customers may find bugs that affect the performance of the system as the most critical. An extensible bug scoring and tracking tool may be customizable by the customer or developer allowing customized prioritization, scoring, and the like of the software bugs. The bug scoring and tracking tool may provide more than one scoring and ranking for each bug. Each bug may be associated with more than one score, priority, ranking, or the like. Each bug may be associated with more than one score, wherein each score may correspond to different software versions, different customers, assumptions about the bug, software developers, and the like.

The software bug scoring and tracking tool may also be used to score and track the patches or software updates related to each bug. Each software patch or software update may be scored or prioritized, at least in part, using the methods described herein. Each patch and software update may have more than one score, ranking, or the like depending on the customer, software version, type of deployment, and the like. The score or priority for each patch may be automatically associated with the patch as it is deployed to each customer such that each customer may analyze the priority that is related only to their own system, preferences, deployment, and the like. Based on the ranking, the customers may make their own decisions regarding the timing of the patch installation.

In some embodiments multiple scores and rankings of each bug may be combined to provide one overall score for the impact and of the bug. The one overall score may be used by the software developers of the administrators that will fix the bug to assess the impact and priority of the software error over multiple customers, deployments, software versions, and the like.

As used herein the term "bug" when referring to software means type of an error, flaw, or fault in a computer software program or system. A software bug may produce an incorrect or unexpected result. In some systems a bug may cause the system to behave in unintended ways. "Bugs" may also be found in computer hardware, structures, or systems. Errors in manufacturing or design of hardware may also result in incorrect or unexpected results during the operation of the hardware. Although the present disclosure describes scoring and tracking of software bugs it is to be understood that the methods and systems may pertain to scoring of other types of bugs and errors such as hardware bugs or system bugs.

As used herein the term "patch" when referring to software is a piece of software designed to fix problems, or update a computer program or its supporting data. A patch may be a binary executable, source code, code modification, and the like. In the context of this application, a patch may encompass any type of software update or service pack designed to update software and fix bugs. A patch may fix one or more bugs and update other parts of the software which may not be related to the bug. Although the present disclosure describes scoring and tracking of software patches it is to be understood that the methods and systems may pertain to scoring of other types of patches relating to hardware updates, board spins, and the like.

FIG. 1 shows a high level block diagram for one embodiment of the bug scoring and tracking tool. As illustrated in FIG. 1, Bug Reports are supplied to the tool. The reports of bugs may originate from customers, developers, bug databases, and the like. If the bug originates from a customer, the bug report may include a description of an unexpected behavior, a description of the effect of the bug, description of manifestations, and the like. The bug report may be received with Customer Information that provide details of the customer preferences along with Upgrade Information related to the customer and any System Information related to the reported bug. In some instances the bug report may originate from a developer or an internal entity and not a customer. The Bug Report may include specific code areas, snippets, files, and the like which have been identified to have a bug. The Customer Information in such cases may be related to an estimate of the scope of the bug and the Upgrade Information and the System Information may relate to the code base which the bug may affect. The tool may output a Bug Priority list and a Patch Priority list that may be specific to each customer, software version, or system. The tool may generate Customer Reports specific to each to customer which may provide status on the severity of each identified bug and/or provide the status regarding the resolution to each bug. The Customer Reports may also include patches relevant to each customer as well as their priority and the issues or bugs they resolve.

Referring to FIG. 1, the bug scoring and tracking tool includes a number of components and modules; one or more data processors 112 (also referred to as processors), a scoring engine 113, a memory 114, a number of databases (e.g. deployment database 118, bug database 119, and a patch database 115). An input/output module 116 is also provided with suitable functionality to interact with an external database 120 or other external data source, which may be operated by the bug scoring and tracking tool 110 or by a third party.

The scoring engine 113 may receive and gather data from the internal and external data sources related to the bug. The data may be used to calculate parameter scores related to each bug. The parameter scores may then be used to calculate a bug score which may be used to prioritize the bug and patches associated with the bug.

The deployment database 118 may include, for example, information regarding the deployment history and activity of each software version, module, library, script, or code. The deployment database 118 may include statistics as to how many customers have downloaded or are actively using a specific version of a code. The statistics may include how actively each version of the software is used and may contain information regarding how many users the software services and the like. For each deployment of the software, the database may contain information regarding details of the system it is deployed on. For example, the database may contain information indicating if the software is contained in a private network or cloud or if it is exposed to the general public. Each deployment record may have information associated with preferences for each customer and each deployment as to the priority of issues or bugs that are the most important to the customer. Deployment data may include information regarding the criticality of each software or code to the operation of each deployment and how often the code is initiated or executed. In some deployments the software may only be installed but never used by a customer so although some code may have a large deployment, the impact of the deployment may be relatively small. The deployment database 118 may store all the deployment information locally on the same system as the scoring and tracking tool or externally on a different system.

Deployment data may be stored in a variety of different databases. Some databases may include information about the software deployment of specific versions of software or pertaining only to specific customers. This information may be spread across multiple groups, development teams, marketing or business divisions. The bug scoring and tracking tool may receive information from external databases 120 through the input/output module 116.

Returning now to FIG. 1, the bug database 119 of the bug scoring and tracking tool 110 may include information regarding the history and data related to reported bugs. As bugs are reported, the status of the bugs and their properties may be documented and tracked using the bug database 119. The bug database may include information regarding who reported the bug, the software code the bug is related to, the software versions and customer the bug may affect, the symptoms of the bug, related bugs, related software patches, status, history, persons or parties assigned to resolve the bug, priority or score of the bug, and the like.

The patch database 115 of the bug scoring and tracking tool 110 may include information regarding the history and data related to patches and bug fixes. As new patches and code fixes are developed the status of the patches and their properties may be documented and tracked using the patch database 115. The patch database may include information regarding who generated the patch, the software code the patch is related to, the bug the patch is designed to fix, possible consequences of installing the patch, related patches, history of deployment, patch priority, and the like.

The customer database 117 of the bug scoring and tracking tool 110 may include information regarding customer preferences and customer histories. The database may include information regarding the preferences that may reflect the business and marketing activities of a customer. The preferences may define the types of bugs that may hurt the business operations of the customer. A customer with a strong presence in the financial market, for example, may consider even minor bugs affecting aspects of security of the system to be of high priority.

The bug scoring and tracking tool 110 may include a scoring engine 113 for assigning a score and prioritization to bugs. The ranking may be used to prioritize the list of bugs that require attention and to track the importance of bugs. The scoring engine 113 may be configured to generate a score of a bug. The scoring engine may create a bug score using an analysis of the data associated with the bug based on a mathematical principles. The scoring engine 113 may provide a repeatable and at least partially automated method of calculating the score of a bug thus reducing the risk of miscalculating a bug priority due to human error or a qualitative assessment.

In embodiments, the scoring engine 113 may calculate a bug score using parameter scores from one or more data sources. The scoring engine may receive data from the deployment database 118 or an external database 120 or other external source to determine or estimate parameters scores related to the popularity of the bug. The scoring engine may access data from one or more local or external data sources to gather information related to the bug.

Using the deployment database, for example, the scoring engine may calculate a deployment parameter score which may summarize the deployment data related to each bug.

Deployment data for each bug may be obtained once the code base related to each bug is determined. Using the deployment data a deployment parameter score for the code that the bug affects may be calculated by the tool. The deployment parameter score may be computed or estimated periodically. The bug scoring and tracking tool 110 may compute a deployment parameter score for each software, code portion, or mode module. The score may be saved and used in the computation of the priority or rating of bugs and patches. The deployment parameter score for each software may be periodically updated based on changing deployment characteristics. The deployment parameter score may be computed once a month, one a quarter, in relation to the timing of major software releases and updates, and the like.

Likewise using the one or more of the local or remote data sources the scoring engine may calculate a related code parameter score which summarizes the number of related software releases or code snippets the code affected by the bug may be related to. Similar or related code may be subject to similar mistakes or bugs and may signify a wider scope of the bug. A related bug parameter score may also be calculated. The related parameter score may summarize the number of related bugs based on data from the bug database 119.

In embodiments, the scoring engine may receive data from the local or an external databases or data sources to determine or estimate parameter scored related to the impact of the bug and the consequence of the bug. The scoring engine may receive information regarding the technology and the sub components associated with the bug. Some code may be given a high importance rating and any minor errors in this code may be deemed important. Some code technologies related to GUI or other features for example may be deemed or rated to low importance. The scoring tool may calculate the technology parameter score based on the data received.

The impact or the bug may also be captured with a score for the severity of the effect of the bug. The effect of the bug may be received with the report of the bug. The effect of the bug may be provided as a description and/or a rating. The description and rating may provide an indication of the level of the effect ranging from complete loss of service to a temporary glitch in a graphical user interface. The effects of the bug may be determined from a diagnostic system dump associated with the bug. The effects of the bug may be determined from an independent or automated recreation of bugs. In some embodiments the rating may be manually entered by a person based on the verbal or textual description from a user or a customer. The effects of the bug may be different for different systems and configurations. The symptoms of the bug for different system configurations may also be determined and assigned a score. The bug scoring and tracking tool may use the data to assign an impact parameter score and a severity parameter score which summarize the impact and severity data of the bug respectively.

The scoring engine 113 may include additional parameters that may not be related to the technical aspects or impact of the bug. In embodiments the scoring engine may receive information related to the marketing of the software products related to the bug, the age of the products, business activities, or opportunities related to specific products the bug may affect. For example, a bug affecting a new software product that is being advertised and actively marketed may be considered of a higher importance. Even small bugs that do not have significant effect on the operation of the new software may result in bad publicity due to the extra scrutiny new releases often receive. The scoring engine may receive or calculate a marketing score related to each bug. A higher number for the marketing score may signify a higher activity or visibility.

The parameter scores may be assigned a value or a number. In embodiments the parameter scores assigned or associated with a bug may be scaled or assigned non constant ranges. Some parameters may be scaled to have range from 1 to 4 for example while others may be scaled to have value from 1 to 100. In embodiments the parameter value ranges may be changed or modified to change their importance or impact on the overall bug score or rating. The ranges or scaling of each parameter may be adjusted for each customer based on their preferences. For example, a deployment parameter score of 100 may signify a very large number of downloads or deployments associated with the code related to the bug while a score of 1 may signify none or only a few.

The received or calculated parameter scores related to each bug may be stored in a memory or a table and used to compute an bug score.

In some embodiments the parameter scores may be computed or estimated as each new bug is reported to the tool. The parameter scores may be generated on various levels of granularity. The scores may be generated for each specific deployment, customer, software version, software module, script, code snippet, code class, code library, or the like. The granularity may depend on the availability of data, the structure or architecture of the software, the granularity of possible software updates, and the like.

In one embodiment the parameter scores for each bug may be categorized or assigned into different groups. The groups may be defined to capture the parameter scores related to a specific metric or characteristic associated with the bug. For example, some of the parameters may be categorized into a "bug popularity" group. The group may include the scores of the parameters associated with the number of downloads of the software related to the bug, number of related software releases, or number of related bugs. Another group may be used to capture the parameters scores related to the "bug impact". The bug impact group may include the scores of the parameters associated with effects of the bug on the system, the technical components the bug affects, the breadth of the services and components the bug may affect, and the like.

Other grouping of parameters scores may be specified to marketing, business activities, bug consequences, and the like.

The grouping of the bug parameter scores may be used for computing a bug score. In one embodiment the parameter scores of each of the groups may be arranged in a vector or a matrix. A matrix or vector of parameter scores for each of the groups of parameters may be generated by the scoring engine 113. For example, the parameters scores grouped and related to the bug popularity may be arranged in a matrix A=(ARU RS RB), wherein ARU is the deployment parameter score associated with the number of downloads of the software related to the bug, RS is the code parameter score associated with the number of related software releases, and RB is the related bug parameter score associated with the number of related bugs. Likewise, the parameter scores grouped and related to the bug impact may be arranged in a matrix B=(TC S BI), wherein TC is the technology parameter score associated with technology components affected by the bug, S is the severity parameter score associated with the severity of the effect of the bug, and BI is the bug impact parameter score associated with bug impact.

After the matrices for each group are defined, the overall bug score may be computed as a multiplication of the matrices (inner product):

$$\text{bugs score} = \qquad \text{Eq. 1}$$

$$A \cdot B = (ARU\ RS\ RB)\begin{pmatrix} TC \\ S \\ BI \end{pmatrix} = A*TC + RS*S + RB*BI$$

where * is scalar multiplication.

Using the bug score formula from Eq. 1 the bug scoring engine may compute a single scalar bug score using the parameter scores. For example, the scoring engine may calculate or receive parameter scores: ARU=4, RS=5, RB=12, TC=10, S=4, BI=10. The parameter scores may be grouped into two matrices: A=(4 5 12) and B=(10 4 10). Taking the inner product of matrices A and B the overall bug score may be computed as: bug score=4*10+5*4+12*15=240. The bug score of 240 may be stored in the database and associated with the bug.

In embodiments, the computation of the bug score may be extended and modified to include more than two groups of parameter scores (i.e. more than two matrices). In embodiments the grouping of the parameter scored may be changed, parameter scores that were associated with one group or matrix may be changed depending on the context of the bug, for example. The order of the parameter scores of each group may be changed. A permutation of the parameter score values within a group or matrix may change the significance of each parameter score on the overall bug score. Furthermore, the number of parameters in each group may also change. Although groups of three parameter scores were presented as examples, in other embodiments a group of parameter scores may have four or more scores. In some embodiments each of the parameter scores may be scaled by adding, multiplying or dividing one or more of the parameter scores by a number. The scaling may be used to raise or lower the importance of a parameter score on the overall bug score.

In embodiments where computation of the overall bug score comprises more than two groups of parameter scores the bug score may be computed as:

$$\text{bugs score} = \qquad \text{Eq. 2}$$

$$A \cdot B \cdot \ldots \cdot Z = (A_1\ A_2\ \ldots\ A_i)(B_1\ B_2\ \ldots\ B_i)\ldots(Z_1\ Z_2\ \ldots\ Z_i) =$$

$$A_1 * B_1 * \ldots * Z_1 + A_2 * B_2 * \ldots * Z_2 + \cdots + A_i * B_i * \ldots * Z_i$$

where A, B, Z are matrices of parameter scores, $A_j$, $B_j$, $Z_j$ are the parameter scores of the matrix, and * is scalar multiplication.

In embodiments the scoring engine may compute more than one bug score. The scoring engine may compute different bug scores depending on the customer preferences, software release, and the like. One bug score may be computed using two groups of parameter scores while another with three groups of parameter scores. A third score may be computed with two groups of parameter scores but with the parameter scores scaled by a different value, for example. Each of the different bug scores may be stored in the bug database and associated with a bug. Each of the scores may be labeled or tagged with corresponding description or identifier which can be used to determine the parameter scores and the parameter score groups used in the calculation. The bug scored may be linked or tagged with the customer, software, system, and the like that the score was tailored for. Each score may be described with meta-data, a database record, a link to external information source, and the like.

Figure 2:
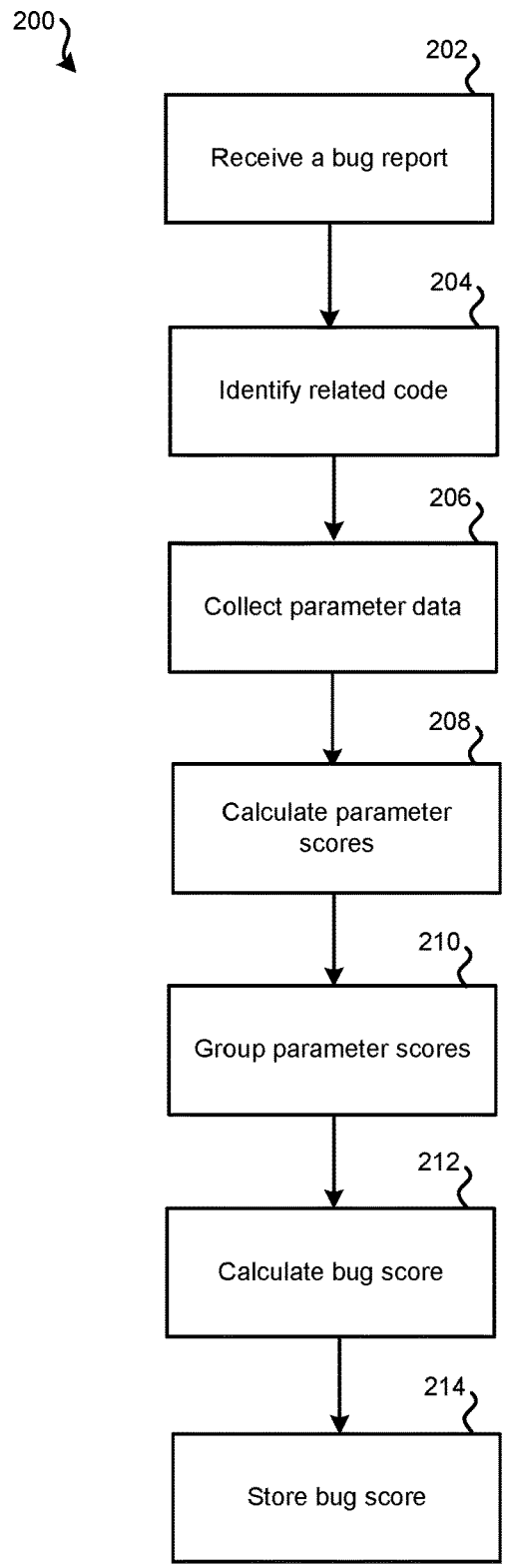
FIG. 2 illustrates one embodiment of a method for generating a bug score.

FIG. 2 shows a flow diagram with the steps 200 used by the bug tool to generate a bug score. In block 202 the bug tool receives a bug report. The bug report may be received from a customer, from a bug database, or other sources. The bug report may identify several properties of the bug such as its behavior, conditions, related system or software releases, and the like. In some instances the bug report may already identify the software code, versions, or releases that the bug is related to. In embodiments where the bug report does not include such related information or only includes partial information the bug tool may be used to determine the information. In block 204 the bug tool may be used to identify the software code related to the bug. The bug tool may be used with any number of external tools, utilities, databases, debuggers, compilers, and the like to determine the code related to the bug. In some instances the code related to the bug may be determined via a lookup table. The description of the bug, or the timing, behavior or the like may be used to determine the code that is responsible for performing the function. For example, if a bug is described to affect a specific function of software a lookup table may be used to determine which code is related to such function. In other embodiments a program dump during the execution of the bug may be used to determine the code that caused an exception or error. In some cases the granularity of the software code associated with the bug may be determined accurately and associated to a specific module, class, library, or even set of code lines. In some more complex bugs the exact nature or the cause of the bug may be difficult to pinpoint and may result from a variety of causes or interaction or various software code pieces. Block 204 may therefore only provide a high level overview of the software code associated with a bug and identify only the software version or software release for example.

In block 206 the bug scoring tool may collect and/or identify the data needed to calculate parameter scores. The data needed to determine each parameter score may vary for each parameter. Some parameter scores may require collecting or identifying two or more values. Other parameter scores may only require a lookup of a value. The parameters may include those discussed above such as the deployment of the code, the popularity of the code, the bug impact, and the like. The bug scoring tool may collect and/or identify data from any number of local and remote databases and data sources. For example, the deployment parameter score, which may be used to signify how many times software was deployed may be associated with several data sources. To determine how many times a piece of code related to a bug has been downloaded the bug scoring tool may first collect data to determine all the possible product versions, software releases, and the modules the code associated with the bug is part of. Next the bug scoring tool may collect data, possibly from other data sources, as to the number of downloads or active deployments associated with each product version, software release, and modules that the code is part of.

In block 208 the bug scoring tool may calculate the parameter scores using, at least in part, the parameter data collected in block 206. Some parameter scores may be equivalent to the collected data for each parameter. In embodiments the parameter scores may be further normalized or scaled. For example, the computation of the deployment parameter score may involve summing all of the collected numbers of downloads for each product version, software release and module associated with the bug. The scoring tool may further normalize the computed deployment parameter score such that it does not exceed a value of 1 by dividing by the total number of deployments of all possible product versions, software releases, and modules, for example.

In block 210 the bug scoring tool may group the parameter scores into one or more groups. In embodiments, the grouping of the parameter score may be based on a similarity of the parameter scores. For example, parameter scores related to number of downloads, number of related software deployments, and number of related bugs may all be grouped together. The parameter scores in each group may be used to generate a matrix for the computation of the overall bug score. The order of the parameter scores in each matrix as well as the grouping of the parameter scores may be dictated by customer preferences, system preferences, or other definitions. The customer preferences may be received from a customer database and may define which parameters should be grouped together. The grouping and order of the parameter scores may affect the final computed bug score. The grouping and order preferences of the customer may reflect a preference of the customer to weight one parameter score higher than another parameter score in determining the score for the bug. In embodiments the bug scoring tool may generate several different combinations of groups and matrices of parameter scores for the computation of one or more bug scores.

In block 212 the bug scoring tool may compute the overall bug score using the matrices of parameter scores generated in 210. The bug scoring tool may compute the inner product of two matrices as defined in Eq. 1 or when more than two matrices are involved compute the overall bug score as defined in equation Eq. 2. The bug scoring tool may compute more than one bug score using different combinations of the matrices. The bug scores may be associated with the preferences from different customers, preferences for specific software packages or versions, and the like.

In block 214 the bug scores may be stored in a database local to the scoring tool in or in an external resource. Each of the bug scores may be associated with additional data. The additional data may describe how the score was computed, what customer preferences were used, related customers, and the like. In some embodiments, the individual parameter scores used to compute the bug score may also be stored by the tool.

After the bug score is computed the software bugs may be prioritized according to their bug scores. The prioritization may be used to define the order in which the bugs will be addressed or fixed. In embodiments, the bugs with the highest bug score may be given the highest priority and scheduled to be fixed or resolved first. In some embodiments the bugs may be prioritized and sorted into groups based on the bug score of each bug. The bug scores may be grouped into "high priority", "medium priority", or "low priority" according to thresholds or ranges of the bug score. In some embodiments bugs with a bug score of 300 or more may be grouped with the high priority bugs, bugs with a bug score of less than 300 but greater than 100 may be grouped with the medium priority bugs, and bugs with a bug score of 100 or less may be grouped with the low priority bugs. Bugs grouped as high priority may be scheduled to be fixed ahead of the medium priority bugs and medium priority bugs may be scheduled to be fixed ahead of the low priority bugs for example. The bugs within each group, however, may not be assigned a specific order within the priority group. Any number of different priority groups may be defined.

In embodiments the bug priority may be assigned based on the relative bug score. For example, the bugs may be ordered based on their bug score and the top 20 bugs may be assigned a high priority, the next 30 bugs a low priority and the like, regardless of the absolute bug scores.

In embodiments, the bugs may be assigned more than one priority depending on which bug score is used in the prioritization. A bug may be assigned a high priority according to one bug score and a low priority according to another bug score. In embodiments a priority list of bugs may be generated corresponding to specific customer preferences using bugs scores computed based on customer preferences. Priority lists and priority rating may be generated for specific software releases, modules, versions, customers, and the like. The priority of the bug may be stored by the bug scoring tool. The priority may be associated with the details of the priority identifying if the priority is specific to a particular customer preferences, if it is general, specific to a software release, and the like.

The bug scoring tool may include a graphical interface for displaying the bug scores, parameters, descriptions, and the like. In embodiments the graphical interface may be used to track the status of the bug. The bug scoring tool may interface with other software, tools, and the like to display or track the bugs, the status of the bugs, and the like.

Figure 3:
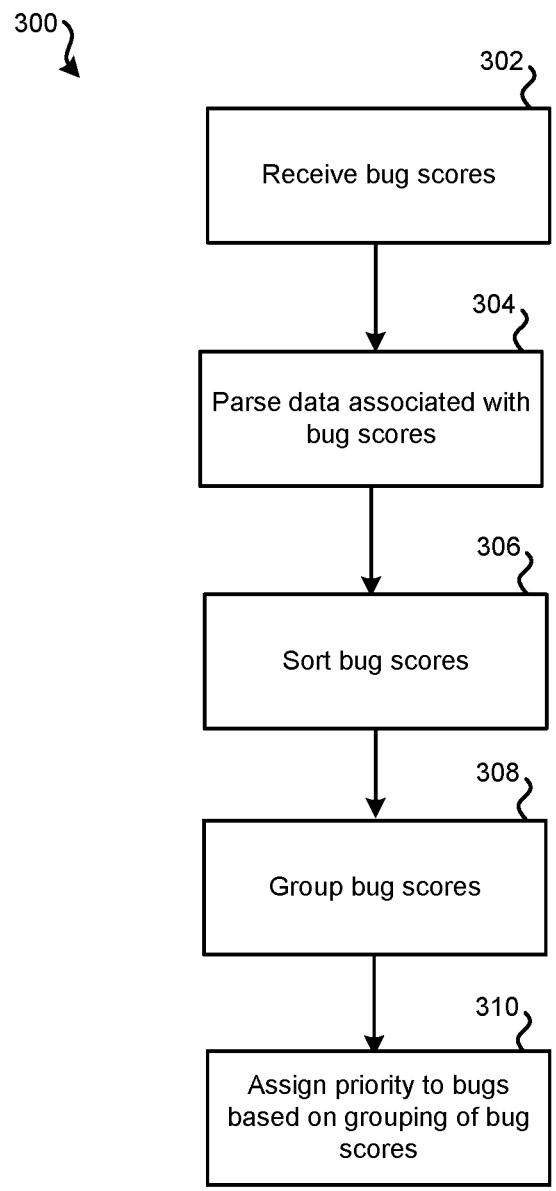
FIG. 3 illustrates one embodiment of a method for determining the priority of a bug.

FIG. 3 shows a flow diagram showing a method 300 used by the bug tool to prioritize bugs. In block 302 the bug scoring and tracking tool may receive bug scores. The bug scores may be stored locally in the bug scoring and tracking tool or in a remote database. The bug scores may include information associated with the bug score that define how the bug score was computed, if the score is relevant only to a specific customer, software release, system, or the like. In block 304 the bug scoring and tracking tool may parse the data to determine the relevance or applicability of the bug scores. Parsing the data at block 304 may allow the tool to determine how many prioritization lists may be generated. Bug scores generated based on preferences for different customers may not be comparable with one another. In general, a relevant prioritization list may be generated only for bug scores that were calculated in a similar manner using compatible preferences. The bug scoring and priority tool may in some cases be configured to generate a priority list only for a specific customer. The tool may parse the data associated with the bug scores at block 304 to locate the bug scores relevant to a specific customer. In block 306 the bug scores relevant to a specific priority list may be sorted. The sorting of the list may be performed from lowest to greatest or any other criteria. In block 308 the bug scores of each prioritization list may be grouped into several groups corresponding to high priority bugs, medium priority bugs, low priority bugs, for example. The grouping and the assignment of priority to the bugs 310 may be based on the absolute value of the bug score, the relative value of the bug score in the list of scores, a predetermine thresholds, and the like. The high priority bugs may be queued to be fixed before the medium priority bugs and the medium priority bugs may be queued to be fixed before the low priority bugs.

The prioritization of bugs based on the bug score may be performed periodically as new bugs are entered or received by the bug scoring and tracking tool. The new bugs may be added to each priority group based on their bug scores.

In embodiments the bug scoring and tracking tool may be used to track the patches and software updates associated with the bug. A software patch or update that solves the specific problem or error associated with the bug may be given a similar rating and score as the bug it is fixing. Propagating the bug score and the bug priority to the software patch may provide a score and priority to the patch. A priority and score for a patch may be important to identify patches that require immediate install. Like for bugs, the priority preferences for patches may be different for different customers, software releases, and the like. The patch may have more than one priority or score wherein each of the priorities and scores may be associated with different customer, software version, and the like.

In embodiments, the bug scoring and tracking tool may be used to generate software updates and patch reports tailored to customer preferences. Software patches relating to high priority bugs as rated and prioritized according to a customer's preferences may be bundled into one or more periodic software updates. The bug scoring and tracking tools may be configured to generate a report outlining the status of bugs and patches relevant to each customer's system and software versions. The report may outline the status of bugs reported by the customer.

Figure 4:
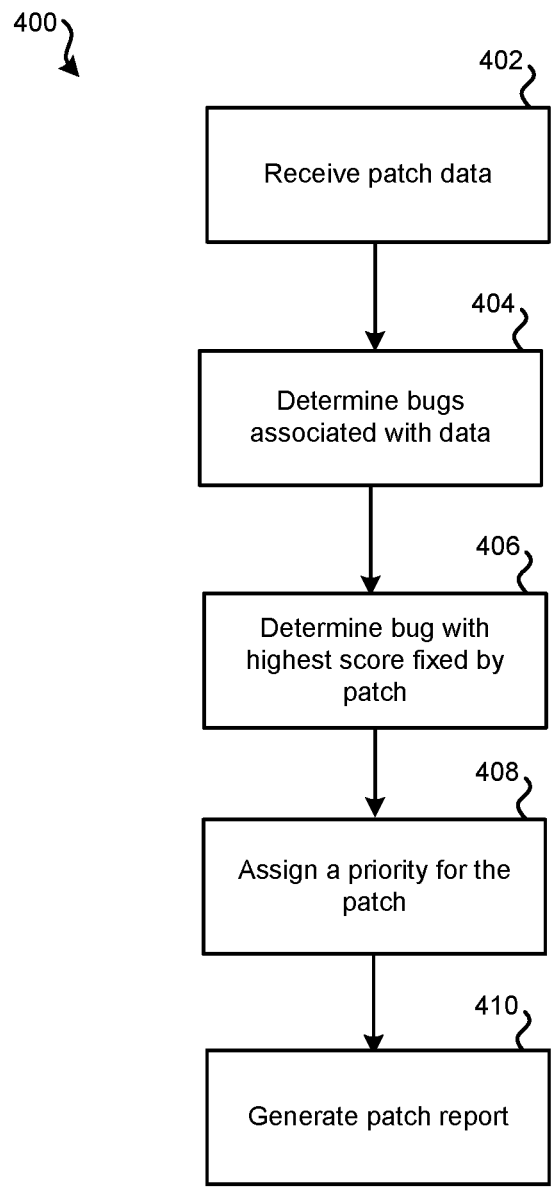
FIG. 4 illustrates one embodiment of a method for determining the priority of software patches.

FIG. 4 shows a flow diagram showing a method 400 for generating a priority rating for a patch. The priority rating may be associated with the priority rating of the bugs the patch fixes. A different priority rating of a patch may be generated for different customer allowing the customer to make an informed decision if they want to install the patch. The bug scoring and tracking tool receives data associated with each patch 402. The patch may not be customer or version specific and may not include any information related to specific customer preferences. The patch may include information regarding the bugs the patch fixes. The bug scoring and tracking tool may read the patch data and receive the data for the bugs associated with the patch 404. The bug scoring and tracking tool may determine the bug scores associated with the bugs. Each bug may have more than one bug score, the scoring and tracking tool may parse the data to determine the scores applicable to a specific customer, software release, and the like. The tool may determine the highest relevant bug score and the priority 406 for the patch. The tool may assign the highest bug score and priority to the patch 408. The patch may have more than one score and priority. Each patch may have multiple scores and priorities that are relevant to different customers, software versions, and the like. For each customer, software version, and the like the bug scoring and tracking tool may generate a report and a prioritized patch list.

The bug scoring and tracking tool or one or more of its modules and components may be a software module, a hardware module, virtual appliance, code, scripts, and the like. The bug scoring and tracking tool may be a service that may be deployed by a platform. In embodiments, bug scoring and tracking tool may be developed, deployed and monitored at a source server and using a support cloud platform. A portal and a gateway of the support cloud platform may be used to remotely deploy, manage, and monitor the services bug reporting, patch deployment, system monitoring, and other functions and services related to the bug scoring and tracking tool. Embodiments of the support cloud portal has been described in the co-pending and commonly assigned U.S. patent application Ser. No. 13/937,970, filed Jul. 9, 2013 and entitled "ADVANCED CUSTOMER SUPPORT SERVICES—ADVANCED SUPPORT CLOUD PORTAL," herein incorporated by reference in its entirety and for all purposes. Some aspects of embodiments of the gateway for the support cloud portal have also been described in U.S. patent application Ser. No. 12/408,170 filed on Mar. 20, 2009 entitled "METHOD AND SYSTEM FOR TRANSPORTING TELEMETRY DATA ACROSS A NETWORK," U.S. patent application Ser. No. 11/151,645 filed on Jun. 14, 2005 entitled "METHOD AND SYSTEM FOR RELOCATING AND USING ENTERPRISE MANAGEMENT TOOLS IN A SERVICE PROVIDER MODEL," and U.S. patent application Ser. No. 11/151,646 filed on Jun. 14, 2005 entitled "METHOD AND SYSTEM FOR REMOTE MANAGEMENT OF CUSTOMER SERVERS," each application herein incorporated by reference in its entirety and for all purposes.

Figure 5:
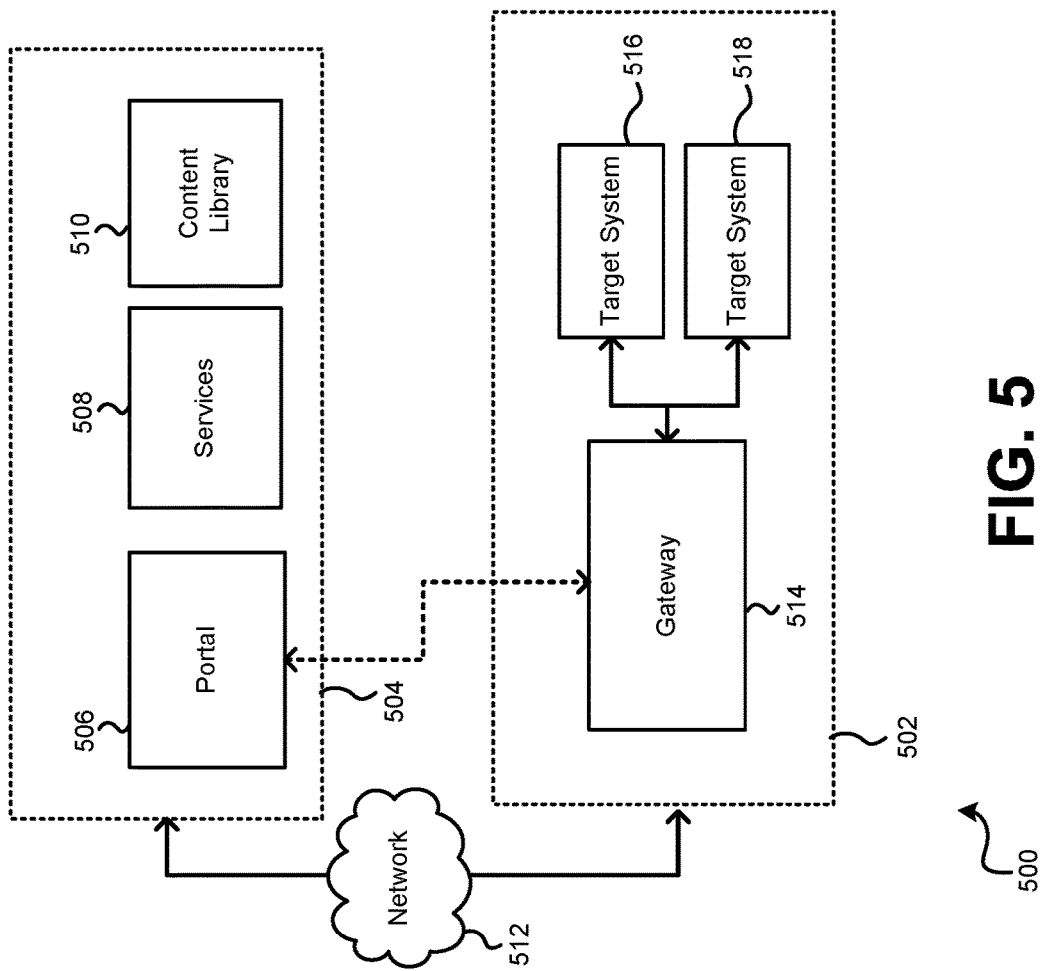
FIG. 5 illustrates an embodiment of a support platform system.

FIG. 5 illustrates a block diagram of an embodiment of a support cloud platform 500. The platform may be used to remotely deploy the services, functions, and methods associated with the bug scoring and tracking tool to one or more target systems 516, 518 on a customer's data center 502. The services, functions, and methods may be deployed and monitored from a remote production cloud 504 via a network 512. The services, functions, and methods may be deployed from the portal 506 to a gateway 514 of the customer's data center 502. The gateway may be used to deploy the services to servers and target systems 516, 518 of the customer's data center. The gateway 514 may collect system data, customer data, performance data, and/or the like and transmit the data to the production cloud 504 where it may be used for further analysis and used to classify and rate bugs for each customer. During the execution of the services, the gateway may monitor the service and collect data. The data may be stored, analyzed, and displayed using the portal 506. Bug reports, patch reports, lists of bugs and/or patches with scores and ratings may be displayed and available to the customer via the portal 506.

The production cloud 504 of the cloud platform 500 may include a collection of available services 508 and a content library 510 that may be delivered to the gateway 514. Different services may be provided for different functions or modules of the bug scoring and tracking tool. One service may provide patch installation and tracking functionality while another bug tracking functionality, for example. Each service may be selected, deployed, and monitored using the portal 506. Data collected by the production cloud 504 during bug rating, discovery, path deployment installation, and/or the like may be used by other services to improve service, performance, and/or the reliability of the customer data center 502. The data may be used to improve a modeling service, for example.

Figure 6:
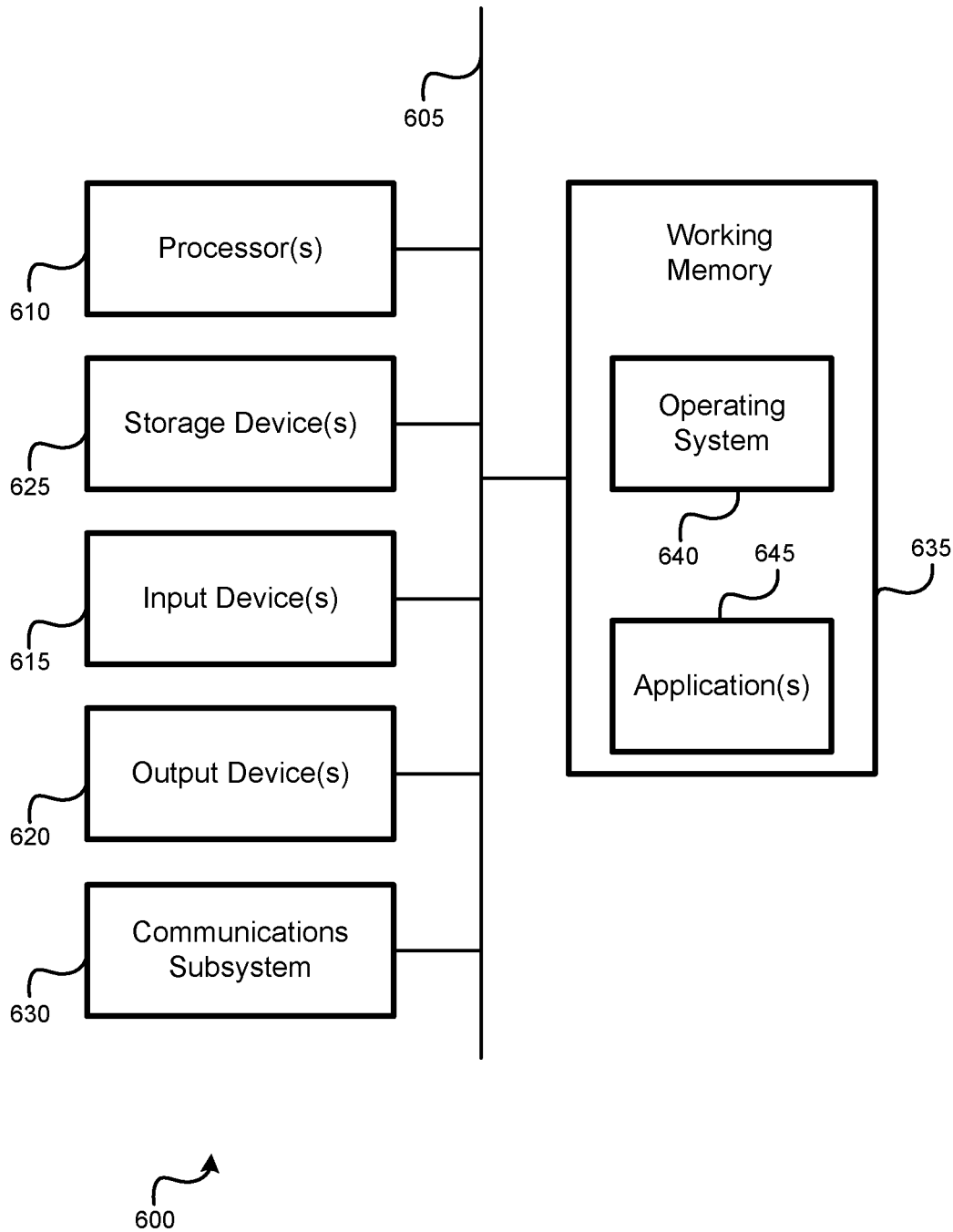
FIG. 6 illustrates an embodiment of a computer system.

FIG. 6 illustrates an embodiment of a computer system. A computer system as illustrated in FIG. 6 may be incorporated as part of the previously described computerized systems, such as system 100 of FIG. 1. Computer system 600 can represent some or all of the components of the computer systems and/or the remote computer systems discussed in this application. Computer system 600 may execute the analysis tool. FIG. 6 provides a schematic illustration of an embodiment of a computer system 600 that can perform the methods provided by various embodiments, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 500 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processors 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system can be distributed across a network. For example, some processing may be performed in one location using a first processor while other processing may be performed by another processor remote from the first processor. Other components of computer system 600 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system comprising:
one or more processors; and
a memory communicatively coupled with and readable by the one or more processors and having stored therein a series of instructions which, when executed by the one or more processors, cause the one or more processors to:
receive a software bug report, the software bug report having a data portion describing a plurality of software bugs, wherein the data portion includes information describing at least one effect of at least one software bug of the plurality of software bugs;
determine at least one code base associated the plurality of software bugs based at least in part on the at least one effect, wherein the at least one code base is a software code containing a coding error causing the at least one effect;
process a customer preference, the customer preference defining a set of parameters that indicate preferences for rating the plurality of software bugs;
generate a first set of bug scores at least in part by, for each software bug of the plurality of software bugs:
calculating a respective set of parameter scores in relation to the respective software bug, wherein the respective set of parameter scores correspond to a respective quantification of the set of parameters defined in the customer preference; and
computing a respective bug score based at least in part on the respective set of parameter scores;
process first data associated with a patch, including information regarding a set of software bugs addressed by the patch, wherein the set of software bugs corresponds at least in part to the plurality of software bugs;
process second data for the set of software bugs addressed by the patch, and determine a second set of bug scores for the set of software bugs, wherein the second set of bug scores is different from the first set of bug scores;
determine a first priority for the patch based at least in part on the second set of bug scores; and
generate a first patch report with a first prioritization of the patch, the first prioritization based at least in part on the first priority determined.

2. The system of claim 1, wherein the series of instructions further cause the one or more processors to:
generate a prioritized list of patches based at least in part on the first set of bug scores;
wherein the generating the first patch report is based at least in part on the prioritized list of patches, and the first patch report indicates a respective prioritization of each patch of the prioritized list of patches.

3. The system of claim 2, wherein the series of instructions further cause the one or more processors to:
process a second customer preference, the second customer preference defining a second set of parameters that indicate different preferences for rating the plurality of software bugs;
generate a third set of bug scores based at least in part on the second customer preference; and
determine a second priority for the patch based at least in part on the third set of bug scores, wherein the second priority is different from the first priority.

4. The system of claim 2, wherein the series of instructions further cause the one or more processors to:
assign the first priority to the patch as the patch is remotely deployed via a network to a remote target system.

5. The system from claim 4, wherein the series of instructions further cause the one or more processors to:

deploy the patch from a server system to the remote target system via a portal of the server system and a gateway installed at a datacenter comprising the remote target system.

6. The system of claim 5, wherein the series of instructions further cause the one or more processors to:
determine a highest bug score of the second set of bug scores;
assign the highest bug score to the patch;
identify the patch for installation based at least in part on the highest bug score; and
facilitate exposing the highest bug score via the portal.

7. The system of claim 1, wherein the respective set of parameter scores include one or more of:
a deployment parameter score, wherein the deployment parameter score summarizes a number of times the code base has been deployed;
an impact parameter score, wherein the impact parameter score summarizes a severity of the at least one effect of the at least one software bug;
a related bug parameter score, wherein the related bug parameter score summarizes a number of bugs related to the at least one software bug; or
a technology parameter score, wherein the technology parameter score summarizes an importance of the code base.

8. The system of claim 1, wherein the series of instructions further cause the one or more processors to:
determine a second priority for the patch based at least in part on a third set of bug scores, wherein the second priority is different from the first priority; and
generate a second patch report with a second prioritization of the patch, the second prioritization based at least in part on the second priority determined, wherein the first patch report is different from the second patch report.

9. A method comprising:
receiving a software bug report, the software bug report having a data portion describing a plurality of software bugs, wherein the data portion includes information describing at least one effect of at least one software bug of the plurality of software bugs;
determining at least one code base associated the plurality of software bugs based at least in part on the at least one effect, wherein the at least one code base is a software code containing a coding error causing the at least one effect;
processing a customer preference, the customer preference defining a set of parameters that indicate preferences for rating the plurality of software bugs;
generating a first set of bug scores at least in part by, for each software bug of the plurality of software bugs:
calculating a respective set of parameter scores in relation to the respective software bug, wherein the respective set of parameter scores correspond to a respective quantification of the set of parameters defined in the customer preference; and
computing a respective bug score based at least in part on the respective set of parameter scores;
processing first data associated with a patch, including information regarding a set of software bugs addressed by the patch, wherein the set of software bugs corresponds at least in part to the plurality of software bugs;
processing second data for the set of software bugs addressed by the patch, and determine a second set of bug scores for the set of software bugs, wherein the second set of bug scores is different from the first set of bug scores;
determining a first priority for the patch based at least in part on the second set of bug scores; and
generating a patch report with a first prioritization of the patch, the first prioritization based at least in part on the first priority determined.

10. The method of claim 9, further comprising:
generating a prioritized list of patches based at least in part on the first set of bug scores;
wherein the generating the patch report is based at least in part on the prioritized list of patches, and the patch report indicates a respective prioritization of each patch of the prioritized list of patches.

11. The method of claim 10, further comprising:
processing a second customer preference, the second customer preference defining a second set of parameters that indicate different preferences for rating the plurality of software bugs;
generating a third set of bug scores based at least in part on the second customer preference; and
determining a second priority for the patch based at least in part on the third set of bug scores, wherein the second priority is different from the first priority.

12. The method of claim 10, further comprising:
assigning the first priority to the patch as the patch is remotely deployed via a network to a remote target system.

13. The method of claim 12, further comprising:
deploying the patch from a server system to the remote target system via a portal of the server system and a gateway installed at a datacenter comprising the remote target system.

14. The method of claim 13, further comprising:
determining a highest bug score of the second set of bug scores;
assigning the highest bug score to the patch;
identifying the patch for installation based at least in part on the highest bug score; and
facilitate exposing the highest bug score via the portal.

15. The method of claim 9, wherein the respective set of parameter scores include one or more of:
a deployment parameter score, wherein the deployment parameter score summarizes a number of times the code base has been deployed;
an impact parameter score, wherein the impact parameter score summarizes a severity of the at least one effect of the at least one software bug;
a related bug parameter score, wherein the related bug parameter score summarizes a number of bugs related to the at least one software bug; or
a technology parameter score, wherein the technology parameter score summarizes an importance of the code base.

16. One or more non-transitory, processor-readable media storing thereon instructions, which, when executed by one or more processors, cause the one or more processors to:
receive a software bug report, the software bug report having a data portion describing a plurality of software bugs, wherein the data portion includes information describing at least one effect of at least one software bug of the plurality of software bugs;
determine at least one code base associated the plurality of software bugs based at least in part on the at least one effect, wherein the at least one code base is a software code containing a coding error causing the at least one effect;

process a customer preference, the customer preference defining a set of parameters that indicate preferences for rating the plurality of software bugs;
generate a first set of bug scores at least in part by, for each software bug of the plurality of software bugs:
calculating a respective set of parameter scores in relation to the respective software bug, wherein the respective set of parameter scores correspond to a respective quantification of the set of parameters defined in the customer preference; and
computing a respective bug score based at least in part on the respective set of parameter scores;
process first data associated with a patch, including information regarding a set of software bugs addressed by the patch, wherein the set of software bugs corresponds at least in part to the plurality of software bugs;
process second data for the set of software bugs addressed by the patch, and determine a second set of bug scores for the set of software bugs, wherein the second set of bug scores is different from the first set of bug scores;
determine a first priority for the patch based at least in part on the second set of bug scores; and
generate a patch report with a first prioritization of the patch, the first prioritization based at least in part on the first priority determined.

17. The one or more non-transitory, processor-readable media of claim 16, wherein the instructions further cause the one or more processors to:
generate a prioritized list of patches based at least in part on the first set of bug scores;
wherein the generating the patch report is based at least in part on the prioritized list of patches, and the patch report indicates a respective prioritization of each patch of the prioritized list of patches.

18. The one or more non-transitory, processor-readable media of claim 16, wherein the instructions further cause the one or more processors to:
process a second customer preference, the second customer preference defining a second set of parameters that indicate different preferences for rating the plurality of software bugs;
generate a third set of bug scores based at least in part on the second customer preference; and
determine a second priority for the patch based at least in part on the third set of bug scores, wherein the second priority is different from the first priority.

19. The one or more non-transitory, processor-readable media of claim 18, wherein the instructions further cause the one or more processors to:
assign the first priority to the patch as the patch is remotely deployed via a network to a remote target system.

20. The one or more non-transitory, processor-readable media of claim 19, wherein the instructions further cause the one or more processors to:
deploy the patch from a server system to the remote target system via a portal of the server system and a gateway installed at a datacenter comprising the remote target system.

* * * * *

UNITED STATES PATENT AND TRADEMARK OFFICE
CERTIFICATE OF CORRECTION

PATENT NO. : 10,198,255 B2
APPLICATION NO. : 15/250522
DATED : February 5, 2019
INVENTOR(S) : Higginson et al.

Page 1 of 1

It is certified that error appears in the above-identified patent and that said Letters Patent is hereby corrected as shown below:

On the Title Page

On page 3, Column 2, Item (56) under Other Publications, Line 3, delete "13/937/970," and insert -- 13/937,970, --, therefor.

In the Specification

In Column 9, Line 54, delete "$A_j$, $B_j$, $Z_j$" and insert -- $A_i$, $B_i$, $Z_i$ --, therefor.

In Column 13, Line 65, delete "2013" and insert -- 2013, --, therefor.

In the Claims

In Column 18, Line 66, in Claim 5, delete "from" and insert -- of --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*